US 6,659,383 B2

(12) United States Patent
Junker

(10) Patent No.: US 6,659,383 B2
(45) Date of Patent: Dec. 9, 2003

(54) SEAT BELT RETRACTOR

(75) Inventor: Klaus Junker, München (DE)

(73) Assignee: Breed Automotive Technology, Inc., Lakeland, FL (US)

(*) Notice: Subject to any disclaimer, the term of this patent is extended or adjusted under 35 U.S.C. 154(b) by 76 days.

(21) Appl. No.: 10/135,565

(22) Filed: May 1, 2002

(65) Prior Publication Data

US 2003/0034415 A1 Feb. 20, 2003

(30) Foreign Application Priority Data

Aug. 14, 2001 (DE) .......................... 101 39 816

(51) Int. Cl.[7] .............................................. B65H 75/48
(52) U.S. Cl. ...................... 242/379.1; 280/805; 280/807
(58) Field of Search ...................... 242/379.1; 280/805, 280/806, 807; 297/472, 478

(56) References Cited

U.S. PATENT DOCUMENTS

| 4,453,681 A | 6/1984 | Gueguen et al. ....... 242/107.4 A |
| 5,779,176 A | 7/1998 | Hori et al. ................ 242/379.1 |
| 5,779,177 A | 7/1998 | Kielwein .................. 242/382.6 |
| 5,954,287 A | 9/1999 | Hirase ..................... 242/379.1 |

FOREIGN PATENT DOCUMENTS

| DE | 4426479 | 2/1996 |
| DE | 19820641 | 11/1998 |
| DE | 20006619 | 9/2000 |

*Primary Examiner*—John Q. Nguyen
(74) *Attorney, Agent, or Firm*—Lonnie Drayer

(57) ABSTRACT

A seat belt retractor of a vehicle with a belt reel for the seat belt has a frame with two frame legs in which a belt reel is rotatably mounted. A torque rod is arranged in the belt reel with one end if the torque rod connected to a first belt reel part arranged inside an aperture in a frame leg. Another end of the torque rod is connected to a second belt reel part which receives the wound seat belt. A blocking device capable of engagement with the first belt reel part with support in one of the two planes of the two frame legs. In the event of an excessive force issuing from the seat belt the second belt reel part can be rotated with respect to the first belt reel part blocked on the frame by torsion of the torque rod. The inner edge of the frame leg aperture, in which the first belt reel part is arranged, is widened in an axial direction in the region of a plurality of peripheral segments with respect to the thickness of the frame leg in the axial direction by the formation of segmental faces arranged around the belt reel axis.

20 Claims, 4 Drawing Sheets

SEAT BELT RETRACTOR

FIELD OF THE INVENTION

The present invention relates to a seat belt retractor.

DISCUSSION OF THE PRIOR ART

WO 00/71394 teaches a seat belt retractor having a belt reel on which and from which the belt webbing of the seat belt can be wound and unwound. The belt reel is rotatably mounted in a frame having two frame legs. A torque rod extending along the axis of rotation of the belt reel is arranged in the belt reel. The torque rod is connected in the region of its one end to a first belt reel part arranged inside a frame leg aperture and in the region of its other end to a second belt reel part receiving the wound seat belt webbing. A blocking device supported on the frame can be brought into engagement with the first belt reel part. As a result in normal operating mode the belt reel is blocked against rotation in the direction of unwinding. The torque rod acts as a force limiter in the event of an excessive force effect issuing from the seat belt, for example in the event of forward displacement of the occupant wearing a seat belt during a crash. As a result the load exerted by the belt webbing on the body of the occupant wearing a seat belt is reduced. In the process the second belt reel part is rotated with respect to the first belt reel part blocked on the frame by torsion of the torque rod, so part of the seat belt webbing is unwound from the second belt reel part with consumption of energy.

It is known from DE 44 26 479 C2 to provide a full load stop between the first belt reel part and the second belt reel part, via which rotation of the second belt reel part with respect to the first belt reel part blocked on the frame is stopped after unwinding of a certain length of the wound seat belt webbing and the belt webbing is completely blocked.

While it is known from U.S. Pat. No. 5,779,177 to support the blocking teeth provided on the blocked belt reel on the inner edge of the frame leg aperture the known retractor does not have a torque rod as energy absorber. The region of the inner edge of the frame leg aperture on which the blocked teeth of the belt reel are supported in the radial direction is reduced locally in terms of its wall thickness in order to achieve a deformation in the support region.

The annular inwardly painting projections about the two frame leg apertures provided on both frame legs known from U.S. Pat. No. 4,453,681 serve to axially position the belt reel. The belt reel is blocked against rotation outside the frame leg aperture.

SUMMARY OF THE INVENTION

There is provided in accordance with the present invention a seat belt retractor comprising: a belt reel having two belt reel parts for receiving seat belt webbing wrapped around the belt reel; a frame having two frame legs in which frame the belt reel is rotatably mounted; a torque rod arranged in the belt reel, said torque rod having a first end and in the region of said end the torque rod is connected to the first belt reel part arranged inside an aperture in a frame leg, said torque rod having a second end and in the region of said second end the torque rod is connected to the second belt reel part; and a blocking device for engaging a belt reel part with support in the plane of at least one of the two frame legs, wherein in the event of an excessive force effect issuing from the seat belt the second belt reel part can be rotated with respect to the first belt reel part blocked on the frame by torsion of the torque rod, the inner edge of the aperture in the frame leg, in which the first belt reel part is arranged, is widened in the axial direction in the region of a plurality of peripheral segments with respect to the thickness of the frame leg in the axial direction by the formation of segmental faces arranged round the belt reel axis.

To this end the inner edge of the frame leg aperture in which the first belt reel part is arranged is widened in the axial direction in the region of a plurality of peripheral segments with respect to the thickness of the frame leg in the axial direction. Consequently segmental faces extending in the axial direction and arranged around the belt reel axis are formed.

Owing to the axial indentation of the inner edge of the frame leg aperture, at least in two peripheral segments, against which the blocked belt reel part rests in the radial direction in the event of excessive belt webbing extension force, the blocked first belt reel part is prevented from being displaced so far out of the frame leg aperture in the axial direction owing to the axial extension of the torque rod upon its torsion that it is no longer supported on the inner edge of the frame leg aperture. Owing to the corresponding indentation of the segmental faces at the inner edge of the frame leg aperture, the axial extension of the torque rod is taken into account so that reliable support for the first belt reel part in the radial direction is always ensured it is also ensured that the blocking device, preferably a pawl, is always engaged with the first belt reel part even when the torque rod comes into effect as en energy absorber. To this end this first belt reel part can in a known manner comprise engaging teeth on its circular peripheral edge.

DETAILED DESCRIPTION OF THE INVENTION

Figure 1:
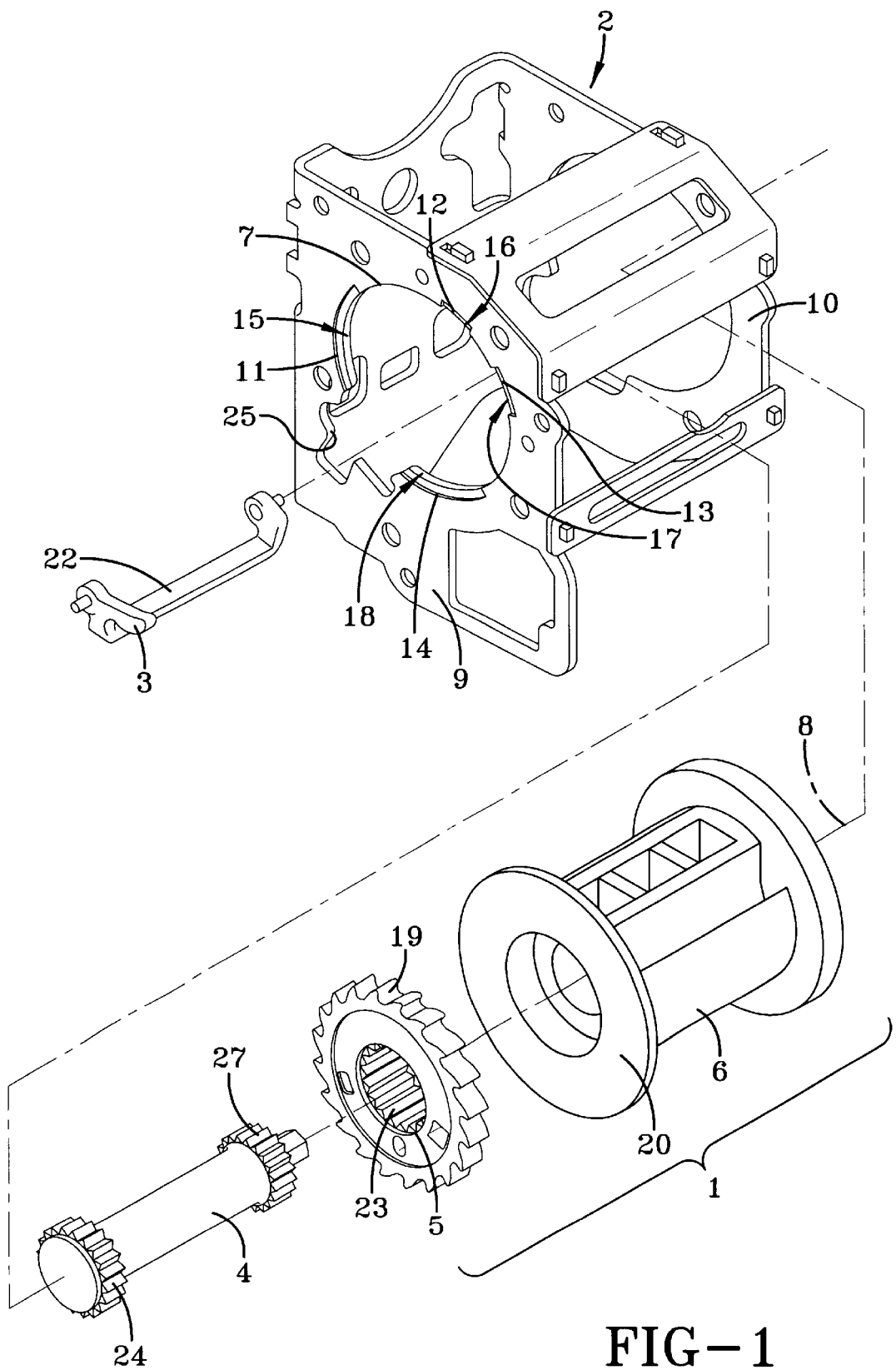
FIG. 1 is an exploded perspective view of a retractor according to the present invention.

The embodiment of a seat belt retractor shown in the figures has a belt reel 1 on which and from which the seat belt can be wound and unwound. The belt reel 1 comprises two belt reel parts 5, 6.

The belt reel 1 is rotatably mounted in a frame 2. The frame comprises two frame legs 9, 10. A torque rod 4 is located inside the belt reel 1 and is coaxial with the axis of rotation 8 of the belt reel. The torque rod has a first end, at the left-hand end in FIGS. 1 and 3, and in the region of said first end the torque rod 4 is rigidly connected to the first belt reel part 5. The belt reel part 5 and the torque rod 4 have mutually meshing teeth 23, 24 for this purpose. Blocking teeth 19 in which a blocking device 3 which is a pawl can engage, as shown in FIG. 2, are provided at a peripheral edge of the disc-shaped portion of the first belt reel part 5. The blocking device is pivotally mounted on the two frame legs 9, 10 by means of a transversely extending rod-shaped pawl bearing 22 and is supported on the two frame legs upon blocking engagement in the blocking teeth 19. The frame leg 9 has an indentation 25 therein in which the blocking device 3, which is a pawl, is pivotally arranged in the plane of the frame leg. FIG. 2 shows the engaged position of the blocking device 3. The blocking device 3 is actuated in a known manner by a belt webbing sensor and/or vehicle sensor (not shown). In normal driving conditions the blocking device 3 does not engage the blocking teeth 19.

Figure 2:
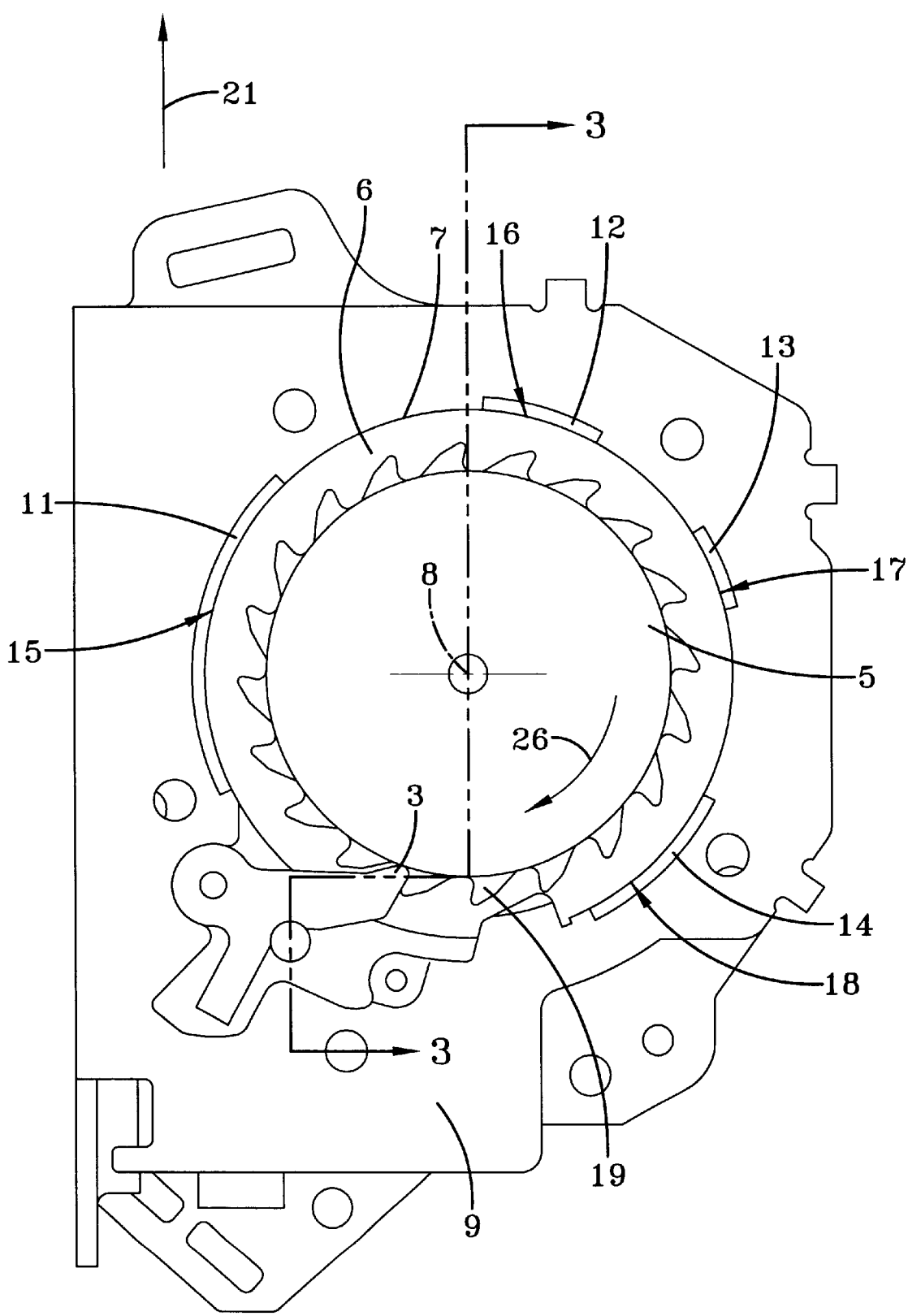
FIG. 2 is a side view of the mechanical side of the embodiment shown in FIG. 1 in the assembled state.
Figure 3:
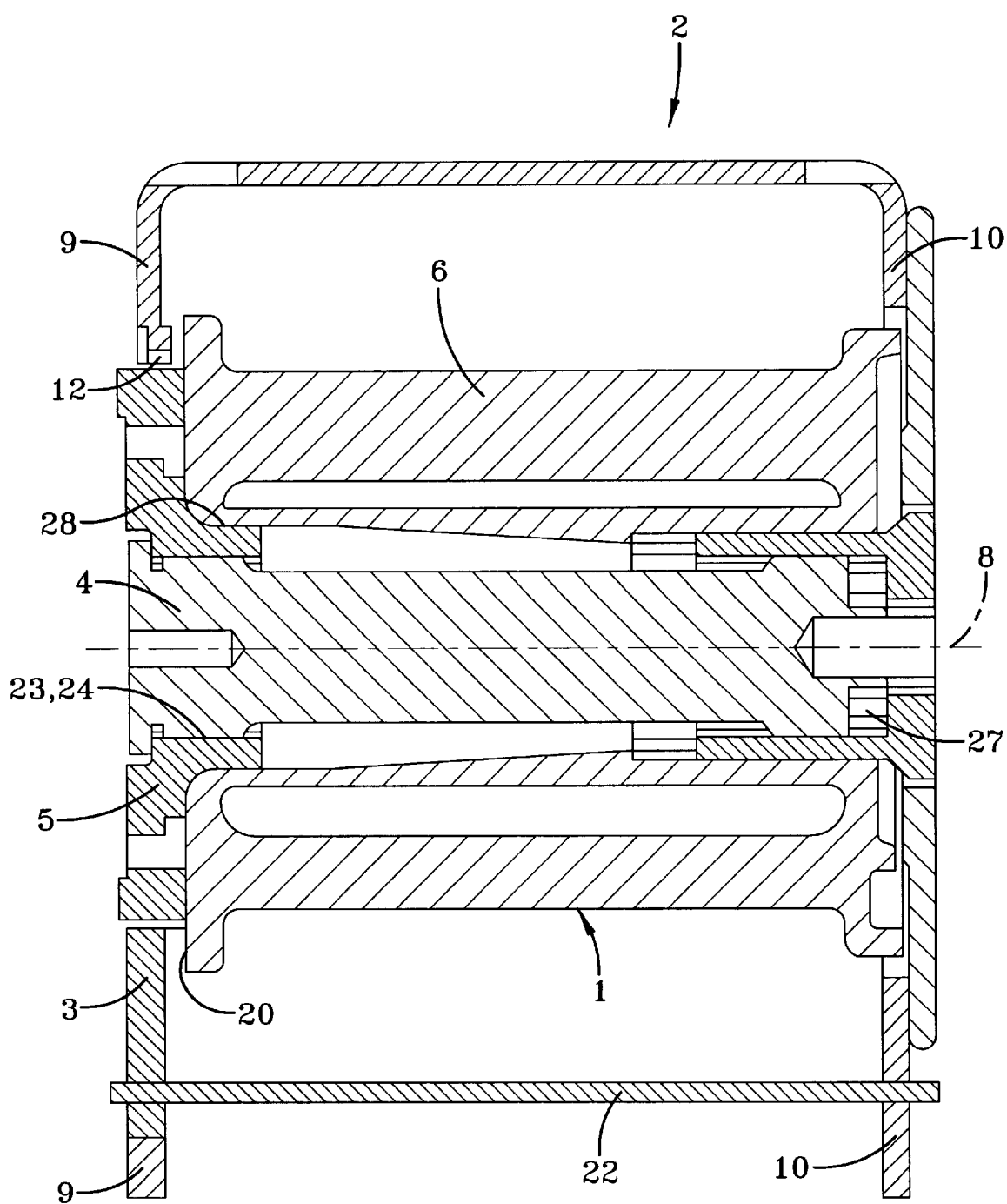
FIG. 3 is a vertical section through the embodiment of FIGS. 1 and 2.
Figure 4:
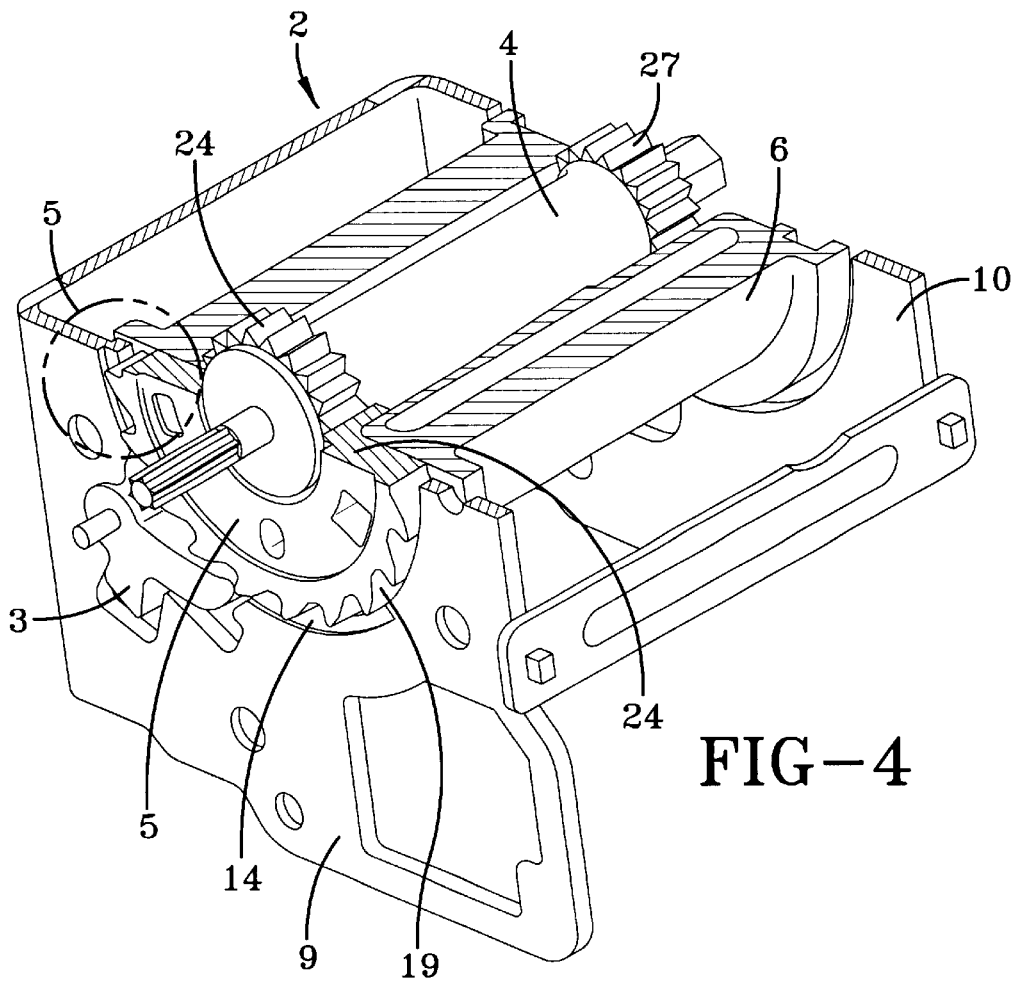
FIG. 4 is a fragmentary perspective view of the embodiment of FIGS. 1 to 3 in horizontal section.
Figure 5:
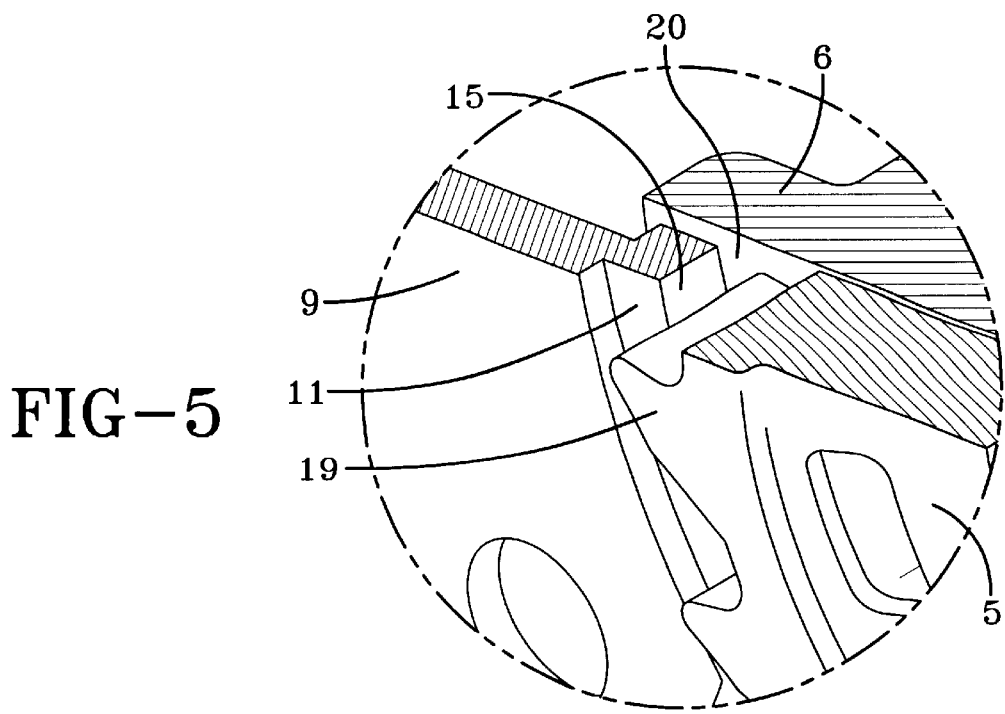
FIG. 5 is an enlarged view of the detail 5 from FIG. 4.

The torque rod has a second end, at the right-hand end in FIGS. 1 and 3, which is non-rotatably connected to the second belt reel part 6 by means of teeth 27. The layers of the wound seat belt webbing (not shown) are located on the spool-like second belt reel 6.

In a crash the blocking device 3 comes into blocking engagement with the blocking teeth 19, as shown in FIG. 2, owing to the action of a sensor (not shown). The belt reel 1 is then blocked in the webbing extension direction 21 and in the direction of rotation 26 shown in FIG. 2. If the vehicle occupant falls into the fastened seat belt owing to forward displacement there is a reduction in the load exerted on the body of the vehicle occupant by the seat belt owing to the torsion of the torque rod 4. In this case the second reel part 6 rotates with respect to the blocked first reel part 5. A movable bearing 28, shown in FIG. 3, is provided for this purpose between the first reel part 5 and the second reel part 6. The axial length of the torque rod 4 is increased upon torsion in the torque rod. As a result the second belt reel part 5 is displaced outward in the axial direction. In the event of a high tensile load in the webbing extension direction 21 the belt reel 1 is displaced, in particular at the end at which the blocking teeth 19 are provided, in the radial direction. As a result the belt reel 1 is supported via the blocking teeth and the first belt reel part 5 on the inner edge of the frame leg aperture 7. Blocking engagement of the blocking pawl is retained in the process.

If a full load stop limiting the torsion of the torque rod is provided between the first belt reel part and the second belt reel part the axial length thereof is greater than the axial extension of the torque rod caused by torsion. The full load stop between the two belt reel parts is therefore unaffected by the axial extension of the torque rod.

Indentations in the inner edge of the frame leg aperture 7 are provided in peripheral segments 11 to 14 to prevent support of the first belt reel part 5 on the inner edge of the frame leg aperture 7 from being removed owing to the outward axial displacement, to the left in FIG. 3, caused by the elongation of the torque rod 4. These indentations form widened segmental faces 15 to 18 arranged around the belt reel axis 8 at the inner edge of the frame leg aperture. This ensures that the first belt reel part 5 is always supported by its blocking teeth on the inner edge of the frame leg aperture 7 even in the event of an axial elongation of the torque rod 4. This support is ensured even in the event of an oblique extension of the seat belt webbing. These widened support faces are ensured in particular by segmental faces 16, 17. As the segmental faces 15 to 18 are provided in peripheral segments 11 to 14 distributed over the periphery of the inner edge axial positioning of the belt reel 1 in the frame 2 is also ensured.

A gap between an end face 20 of the belt reel 1, in particular its second belt reel part 6 is retained, as can be seen in particular in FIG. 3, between the first reel part 5 and the blocking device 3, which is a pawl, owing to the segmental faces 15 to 18 or owing to the corresponding indentations in the frame. The function of the blocking device 3 is not influenced upon axial loading of the belt reel 1. If blocking devices 3, in particular in the form of pawls, are provided on both sides of the frame 2 axial thickening of the segmental faces 15 to 18 can be provided on both frame legs 9, 10 in the peripheral segments 11 to 14. A gap between the blocking device which is a pawl and the end face of the second belt reel part is also ensured even under axial loading. As a result frictional contact between the second belt reel part and the blocking device and therefore impairment of the blocking function thereof are prevented.

The foregoing specification discloses and describes a preferred embodiment of the invention. One skilled in the art will readily recognize that changes and modification can be made to the invention without departing from the true spirit and fair scope of the invention as defined in the following claims.

I claim:

1. A seat belt retractor comprising: a belt reel having two belt reel parts for receiving seat belt webbing wrapped around the belt reel; a frame having two frame legs in which the belt reel is rotatably mounted; a torque rod arranged in the belt reel, said torque rod having a first end and in the region of said end the torque rod is connected to the first belt reel part arranged inside an aperture in a frame leg, said torque rod having a second end and in the region of said second end the torque rod is connected to the second belt reel part; and a blocking device for engaging a belt reel part with support in the plane of at least one of the two frame legs, wherein in the event of an excessive force effect issuing from the seat belt the second belt reel part can be rotated with respect to the first belt reel part blocked on the frame by torsion of the torque rod, the inner edge of the aperture in the frame leg, in which the first belt reel part is arranged, is widened in the axial direction in the region of a plurality of peripheral segments with respect to the thickness of the frame leg in the axial direction by the formation of segmental faces arranged round the belt reel axis.

2. The seat belt retractor according to claim 1, wherein widened segmental faces are formed at least in two peripheral segments, against which faces the blocked belt reel part rests in the radial direction in the event of excessive belt webbing extension force.

3. The seat belt retractor according to claim 2, wherein an axial displacement of the blocked first belt reel part resulting from the axial extension of the torsioned torque rod is within the axial width of the at least two segmental faces.

4. The seat belt retractor according to claim 3, wherein a full load stop provided between the first belt reel part and the second belt reel part and limiting the torsion of the torque rod has a greater axial length than the axial extension of the torque rod caused by the torsion.

5. The seat belt retractor according to claim 4, wherein an axial gap between an end face of the belt reel and the blocking device is ensured by the segmental faces.

6. The seat belt retractor according to claim 4, wherein the segmental faces are provided on both frame legs.

7. The seat belt retractor according to claim 3, wherein an axial gap between an end face of the belt reel and the blocking device is ensured by the segmental faces.

8. The seat belt retractor according to claim 3, wherein the segmental faces are provided on both frame legs.

9. The seat belt retractor according to claim 2, wherein a full load stop provided between the first belt reel part and the second belt reel part and limiting the torsion of the torque rod has a greater axial length than the axial extension of the torque rod caused by the torsion.

10. The seat belt retractor according to claim 9, wherein the segmental faces are provided on both frame legs.

11. The seat belt retractor according to claim 9, wherein an axial gap between an end face of the belt reel and the blocking device is ensured by the segmental faces.

12. The seat belt retractor according to claim 2, wherein an axial gap between an end face of the belt reel and the blocking device is ensured by the segmental faces.

13. The seat belt retractor according to claim 12, wherein the segmental faces are provided on both frame legs.

14. The seat belt retractor according to claim 2, wherein the segmental faces are provided on both frame legs.

15. The seat belt retractor according to claim 1, wherein a full load stop provided between the first belt reel part and the second belt reel part and limiting the torsion of the torque rod has a greater axial length than the axial extension of the torque rod caused by the torsion.

16. The seat belt retractor according to claim 15, wherein the segmental faces are provided on both frame legs.

17. The seat belt retractor according to claim 15, wherein an axial gap between an end face of the belt reel and the blocking device is ensured by the segmental faces.

18. The seat belt retractor according to claim 1, wherein an axial gap between an end face of the belt reel and the blocking device is ensured by the segmental faces.

19. The seat belt retractor according to claim 18, wherein the segmental faces are provided on both frame legs.

20. The seat belt retractor according to claim 1, wherein the segmental faces are provided on both frame legs.

* * * * *